US011939810B2

(12) United States Patent
Wei

(10) Patent No.: US 11,939,810 B2
(45) Date of Patent: Mar. 26, 2024

(54) SHOWER DOOR SLIDING MECHANISM FOR SOFT POSITIONING

(71) Applicant: Foshan Ideal Co., Ltd., Foshan (CN)

(72) Inventor: Wuxiang Wei, Foshan (CN)

(73) Assignee: Foshan Ideal Co., Ltd. (CN)

( * ) Notice: Subject to any disclaimer, the term of this patent is extended or adjusted under 35 U.S.C. 154(b) by 381 days.

(21) Appl. No.: 17/295,300

(22) PCT Filed: Apr. 17, 2020

(86) PCT No.: PCT/CN2020/085415
§ 371 (c)(1),
(2) Date: May 19, 2021

(87) PCT Pub. No.: WO2021/208090
PCT Pub. Date: Oct. 21, 2021

(65) Prior Publication Data

US 2022/0090429 A1 Mar. 24, 2022

(51) Int. Cl.
*E05F 5/00* (2017.01)
*A47K 3/34* (2006.01)
*E05D 15/06* (2006.01)

(52) U.S. Cl.
CPC ................ *E05F 5/003* (2013.01); *A47K 3/34* (2013.01); *E05D 15/063* (2013.01);
(Continued)

(58) Field of Classification Search
CPC ..... E05F 5/00; E05F 5/003; E05F 5/02; E05F 5/027; E05Y 2201/00; E05Y 2201/20;
(Continued)

(56) References Cited

U.S. PATENT DOCUMENTS 1,144,799 A * 6/1915 Tiernan ................. A63F 9/0826 273/153 S
7,866,003 B2 * 1/2011 Tooyama ................ E05F 5/003 16/422
(Continued)

FOREIGN PATENT DOCUMENTS

CN 2336066 Y 9/1999
CN 204002232 U 12/2014
(Continued)

OTHER PUBLICATIONS

International Search Report for Application No. PCT/CN2020/085415, dated Jan. 14, 2021, 8 pages.

*Primary Examiner* — Chi Q Nguyen
(74) *Attorney, Agent, or Firm* — Lerner David LLP

(57) ABSTRACT

A shower door sliding mechanism is disclosed, the shower door sliding mechanism including a track component disposed in a fastening manner, a movable door piece, a pulley component, and a flexible closer component which comprises a fastening bracket and a flexible closer, the track component comprises a track having a longitudinal passage. The longitudinal passage includes a positioning component receiving groove and a sliding groove. A glass clamp component is disposed at a top of the movable door piece, and the top of the glass clamp component is connected to a threaded hole in the pulley component by using an adjusting screw, so that the movable door piece is integrally suspended directly below the flexible closer component and the pulley component. The inner space of the track can be fully utilized to reduce the height of the track and reduce the weight and manufacturing costs of the track.

9 Claims, 12 Drawing Sheets

(52) U.S. Cl.
CPC ...... *E05D 15/0652* (2013.01); *E05Y 2201/21* (2013.01); *E05Y 2201/64* (2013.01); *E05Y 2201/668* (2013.01); *E05Y 2201/684* (2013.01); *E05Y 2900/132* (2013.01)

(58) Field of Classification Search
CPC ............. E05Y 2201/21; E05Y 2201/64; E05Y 2201/684; E05Y 2201/688; E05Y 2201/668; E05D 15/063; E05D 15/0621; E05D 15/0626; E05D 15/0652; A47K 3/34
See application file for complete search history.

(56) References Cited

U.S. PATENT DOCUMENTS

| | | | | |
|---|---|---|---|---|
| 8,651,597 | B2 * | 2/2014 | Kimura | E05F 3/00 312/319.1 |
| 8,745,821 | B2 * | 6/2014 | Chang | E05F 1/16 16/49 |
| 9,388,622 | B1 * | 7/2016 | Paron | E05F 15/56 |
| 9,885,206 | B2 * | 2/2018 | Shin | E05F 3/00 |
| 10,455,989 | B2 * | 10/2019 | Wei | E05D 15/063 |
| 10,724,285 | B2 * | 7/2020 | Dodge | E05F 1/16 |
| 10,738,523 | B2 * | 8/2020 | Wang | E05F 1/16 |
| 11,162,289 | B2 * | 11/2021 | Wei | E05F 1/16 |
| 11,408,218 | B2 * | 8/2022 | Iijima | E05D 15/0626 |
| 11,421,461 | B2 * | 8/2022 | Martin | E05F 3/227 |
| 11,566,461 | B2 * | 1/2023 | Zimmer | E05F 1/16 |
| 2015/0026928 | A1 | 1/2015 | Haab et al. | |
| 2017/0051548 | A1 | 2/2017 | Wang et al. | |

FOREIGN PATENT DOCUMENTS

| | | | |
|---|---|---|---|
| CN | 104340512 | A | 2/2015 |
| CN | 108412350 | A | 8/2018 |
| DE | 202005012954 | U1 | 7/2006 |

* cited by examiner

SHOWER DOOR SLIDING MECHANISM FOR SOFT POSITIONING

CROSS-REFERENCE TO RELATED APPLICATIONS

The present application is a national phase entry under 35 U.S.C. § 371 of International Application No. PCT/CN2020/085415, filed Apr. 17, 2020, which is hereby incorporated herein by reference.

TECHNICAL FIELD

The present invention relates to the field of shower door technologies, and in particular, to impact-free soft positioning of sliding and door opening and closing of a movable door piece in a shower door.

BACKGROUND

In an existing sliding shower door, when a movable door piece slides along a track for door opening and closing, the movable door piece usually may cause impact due to an inertial factor when being opened to the maximum position and closed. A flexible closer applied to the sliding shower door can resolve the impact problem to a certain extent by providing a cushioning effect. However, in an existing designed shower room, a flexible closer is usually mounted on a track, and a bayonet of the flexible closer is exposed outside. In addition, a touch block needs to be added to a movable door piece to enable the flexible closer to act. In this case, the exposed element affects the appearance of the shower room, and user experience is relatively poor. In addition, the bayonet of the existing flexible closer is mounted upward. In this case, the track must have relatively large space in the height direction to mount the flexible closer and a positioning member coupled to the bayonet. As a result, the track has a relatively large overall height and overall weight and relatively high manufacturing costs, and the overall aesthetics of the product is affected.

SUMMARY

A technical problem to be resolved in the present invention is to provide a shower room sliding structure that can fully utilize inner space of a track to greatly reduce the height of the track in view of the foregoing drawbacks of the prior art.

To resolve the technical problem, the present invention uses the following technical solutions: designing a shower door sliding mechanism for soft positioning, including a track component disposed in a fastening manner, a movable door piece, a pulley component, and a flexible closer component movably disposed in the track component by using the pulley component. The flexible closer component includes a fastening bracket and a flexible closer having a bayonet, the flexible closer is fastened to the fastening bracket, and the fastening bracket is connected and fastened to the pulley component and located between two pulley components. The track component includes a track having a longitudinal passage therein and a positioning component that is fastened to the track and that can be coupled to the bayonet. The longitudinal passage is surrounded by an upper wall, a lower wall, a front wall, and a rear wall of the track, the longitudinal passage includes a positioning component receiving groove and a sliding groove in which the flexible closer component and the pulley component can move, the positioning component receiving groove and the sliding groove extend in the longitudinal direction of the track and are distributed adjacently in the lateral direction of the track, and the lower wall has a longitudinal opening and sliding surfaces supporting the pulley component. A glass clamp component is disposed at the top of the movable door piece, and the top of the glass clamp component is connected to a threaded hole in the pulley component by using an adjusting screw, so that the movable door piece is integrally suspended directly below the flexible closer component and the pulley component.

In a preferred implementation, a strip-shaped mounting hole for mounting and fastening the positioning component is formed on the upper wall of the track, the positioning component includes a positioning member and a positioning member fastening piece, the upper wall is sandwiched between the positioning member fastening piece and the positioning member, the positioning member fastening piece is located above the upper wall, the positioning member is located under the upper wall and the positioning member is integrally located in the positioning component receiving groove, two positioning holes and one mounting hole are disposed on an upper end surface of the positioning member, two positioning pins fitting with the positioning holes and a through hole fitting with the mounting hole are disposed on the positioning member fastening piece, the positioning member fastening piece is connected and fastened to the positioning member by fitting a positioning member connecting member with the through hole and the mounting hole, and the width of the positioning member in the lateral direction of the track is greater than the width of the strip-shaped mounting hole.

In a preferred implementation, the glass clamp component includes a first glass clamp piece and a second glass clamp piece, the first glass clamp piece and the second glass clamp piece are assembled and fastened to the movable door piece by using mutually fitted threaded holes and screws, stepped semicircular holes are further disposed in the first glass clamp piece and the second glass clamp piece, the adjusting screw includes a threaded cylinder with a square step and a circular step disposed at the bottom thereof, and the square step and the circular step fit with a circular hole formed by the stepped semicircular holes in the first glass clamp piece and the second glass clamp piece, so that the movable door piece is suspended at a lower end of the adjusting screw by using the glass clamp component.

In a preferred implementation, the pulley component includes a pulley seat and a pulley mounted on the pulley seat, the pulley seat includes a strip-shaped pulley seat main body, one or more bosses extend from one or two sides of the pulley seat main body, the pulley is mounted on the boss, a connecting block for connecting and fastening to the fastening bracket is disposed at one end of the pulley seat, and a connecting hole is disposed in the connecting block.

In a preferred implementation, the fastening bracket is elongated and is a U-shaped cross-sectional profile surrounded by an upper wall, a lower wall, and a rear wall, a closer receiving cavity adapted to receive the flexible closer and a front-side opening opposite to the rear wall are formed in the profile, first connecting holes for connecting to the flexible closer in a fastening manner by using connecting members and second connecting holes for connecting to pulley seats in a fastening manner by using connecting members are disposed in at least one of the upper wall, the lower wall, and the rear wall, the second connecting holes are located at two ends of the fastening bracket, and the first connecting holes are located between the second connecting holes.

In a preferred implementation, third connecting holes for connecting and fastening to the fastening bracket are disposed in the flexible closer, the bayonet is disposed on the surface of the flexible closer, the size of the bayonet corresponds to the length of the positioning member, and when the positioning member is in contact with and coupled to the bayonet, the flexible closer acts to achieve soft positioning.

In a preferred implementation, the flexible closer includes a flexible closer for door closing and/or a flexible closer for door opening.

In a preferred implementation, an opening groove extending in the longitudinal direction of the track is formed on the lower wall, and a fixed door piece and a waterproof seal are mounted in the opening groove in a fastening manner.

In a preferred implementation, connecting holes for fastening the track are disposed on two ends of the track.

It can be learned from the foregoing solutions that, for the shower door sliding mechanism in the present invention, the flexible closer component and the pulley component move in the sliding groove in the track, so that the pulley component and the flexible closer component are hidden in the sliding groove in the track. The longitudinal passage in the track is surrounded by the upper wall, the lower wall, the front wall, and the rear wall of the track, the longitudinal passage includes the positioning component receiving groove and the sliding groove in which the flexible closer component and the pulley component can move, the positioning component receiving groove and the sliding groove extend in the longitudinal direction of the track and are distributed adjacently in the lateral direction of the track, and the lower wall has the longitudinal opening and the sliding surface supporting the pulley component. The glass clamp component is disposed at the top of the movable door piece, and the top of the glass clamp component is connected to the threaded hole in the pulley component by using the adjusting screw, so that the movable door piece is integrally suspended directly below the flexible closer component and the pulley component. The positioning component on the track is mounted on one side of the flexible closer component. In this lateral mounting manner, inner space of the track can be fully utilized to greatly reduce the height of the track and reduce the overall weight and manufacturing costs of the track, and improve the overall aesthetics of the product.

When the movable door piece moves to a certain position in the closing direction, a bayonet of the flexible closer for door closing is in contact with and coupled to a positioning component for door closing mounted on the track, so that the flexible closer for door closing acts to prevent the movable door piece from moving at a high speed and cause the movable door piece to automatically close at a certain low speed. Likewise, when an external force causes the movable door piece to move to a certain position in the door opening direction, a bayonet of the flexible closer for door opening is in contact with and coupled to a positioning component for door opening mounted on the track, so that the flexible closer for door opening acts to prevent the movable door piece from moving at a high speed and cause the movable door piece to automatically reach the door opening position at a certain low speed. Only the flexible closer for door closing, only the flexible closer for door opening, or a bi-directional soft positioning structure for door opening and closing may be disposed based on an actual need. Therefore, the shower door assembly in the present invention can be used to achieve artistic and impact-free soft positioning.

DESCRIPTION OF EMBODIMENTS

The following describes various implementations of the present invention in detail. The embodiments are described below with reference to the accompanying drawings, and other elements that do not affect the protection scope of the claims of this application are omitted from the accompanying drawings. Although the present invention is described with reference to exemplary implementations, it should be understood that the present invention is not limited to these exemplary implementations. On the contrary, the present invention includes not only these implementations but also various variants and improvements.

Figure 1:
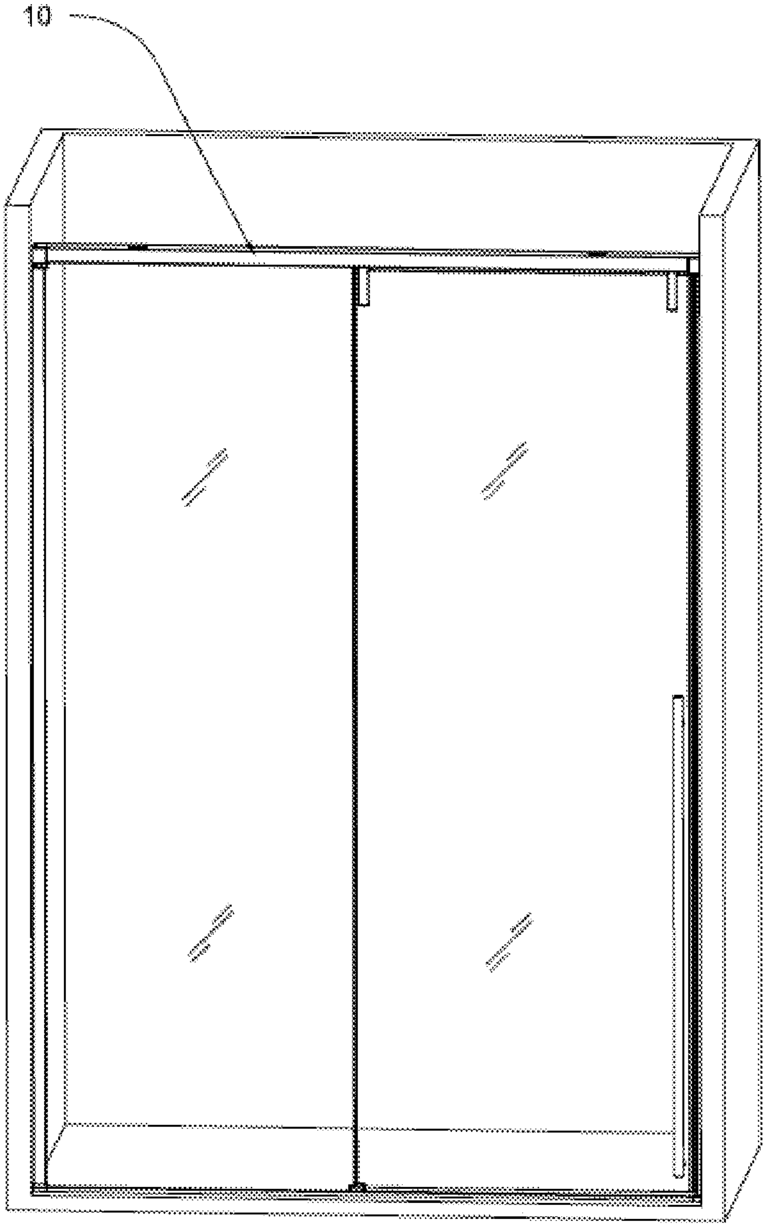
FIG. 1 is a schematic view of application of a shower door sliding mechanism to a shower room according to an implementation of the present invention.

FIG. 1 shows an application location of a shower door sliding mechanism in a shower room according to an implementation of the present invention.

Figure 2:
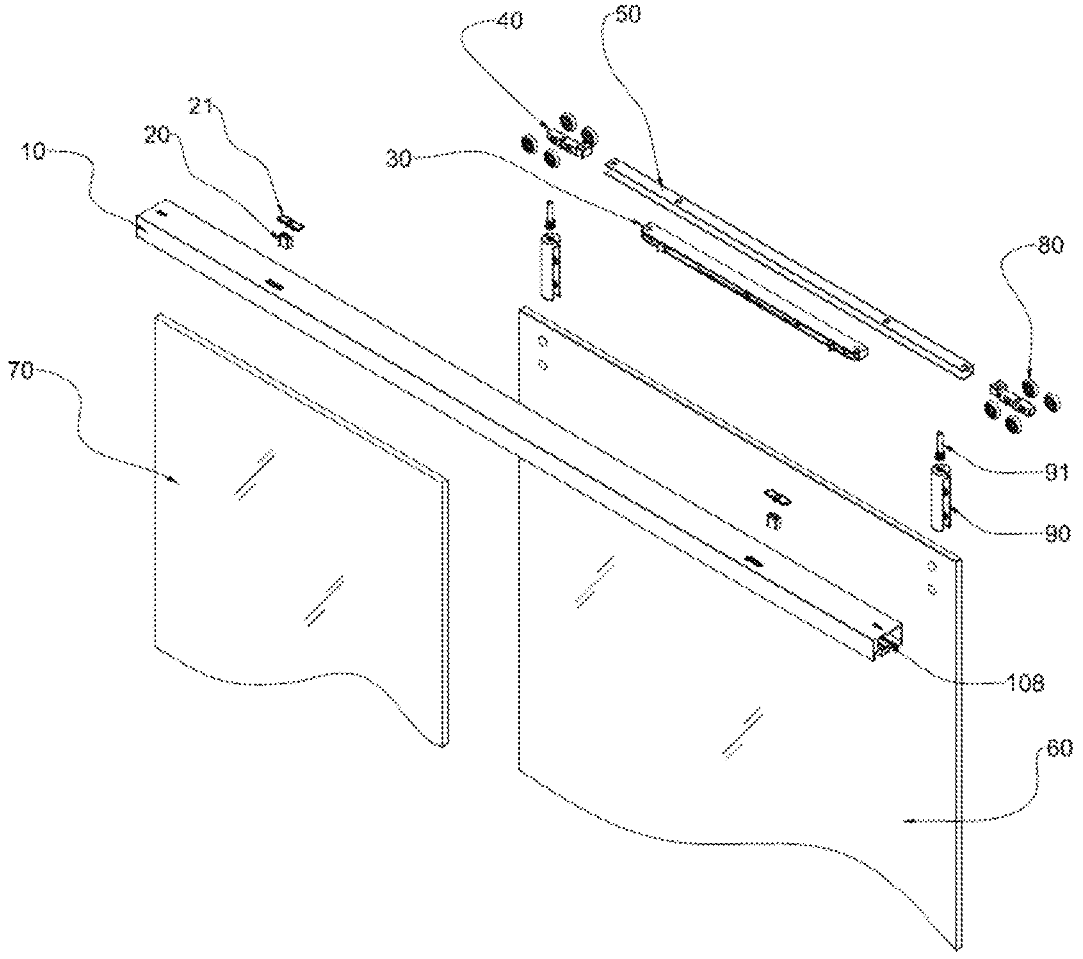
FIG. 2 is a schematic exploded view of components of a shower door sliding mechanism according to an implementation of the present invention.
Figure 3:
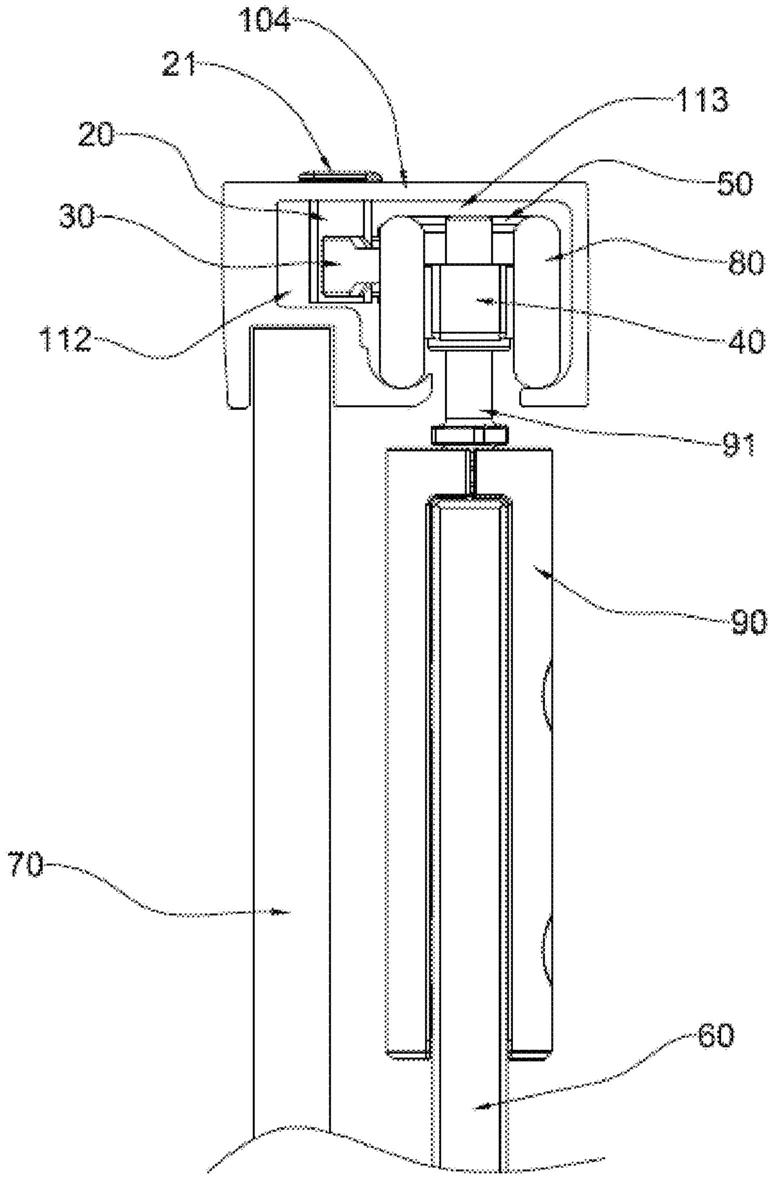
FIG. 3 is a sectional view of the shower door sliding mechanism shown in FIG. 2.

As shown in FIG. 2 and FIG. 3, in an implementation, the shower door sliding mechanism in the present invention includes a movable door piece 60, a fixed door piece 70, a track component, a pulley component, a flexible closer component, a glass clamp component 90, an adjusting screw 91, and the like. The track component is disposed on left and right wallboards or frames of a wall or shower room in a fastening manner. The flexible closer component is connected between left and right pulley components and is movably disposed in the track component by using the pulley component. The flexible closer component includes a fastening bracket 50 and a flexible closer 30 having a bayonet, and the flexible closer 30 is fastened to the fastening bracket 50. The pulley component includes a pulley seat 40 and several pulleys 80. The track component includes a track 10 having a longitudinal passage therein and a positioning component that is fastened to the track 10 and that can be coupled to the bayonet. In this embodiment, there are two positioning components: a positioning component for door closing on the right side and a positioning component for door opening on the left side, and each positioning component includes a positioning member 20 and a positioning member fastening piece 21. The glass clamp component 90 is disposed at the top of the movable door piece 60, and the top of the glass clamp component 90 is connected to a threaded hole 403 in the pulley component by using the adjusting screw 91, so that the movable door piece 60 is integrally suspended directly below the flexible closer component and the pulley component.

Figure 4A:
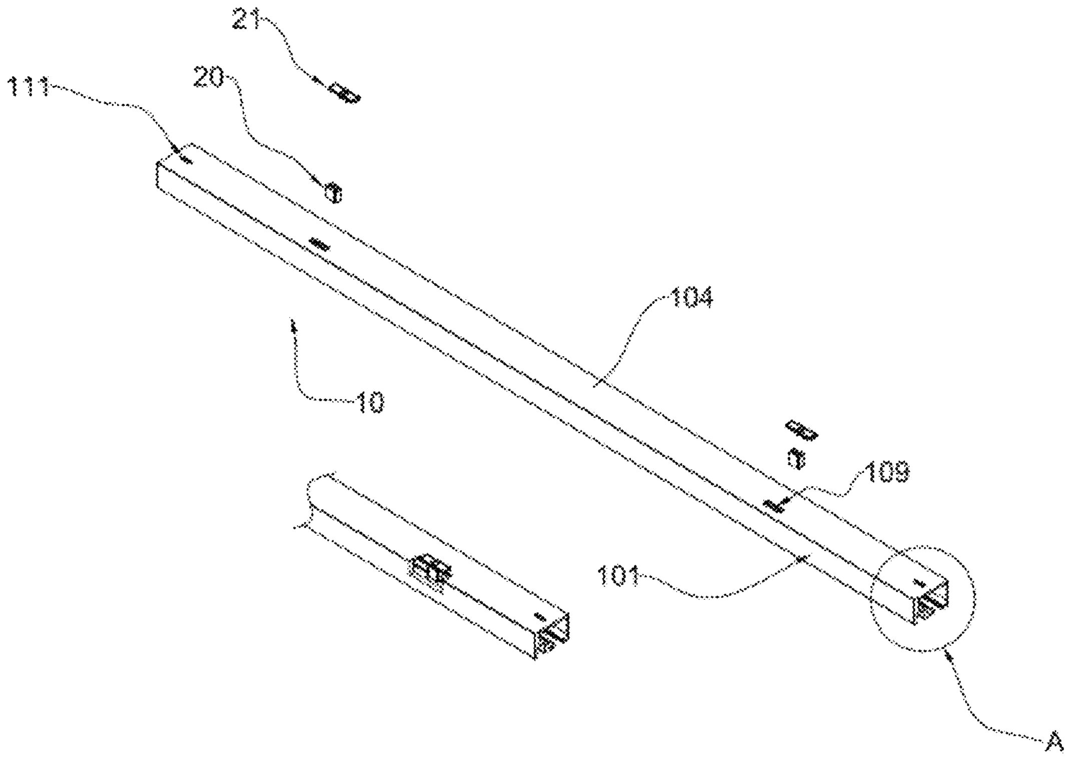
FIG. 4*a* is a schematic structural view of a track component in the shower door sliding mechanism shown in FIG. 2, showing both an exploded state and an assembled state of the track component.
Figure 4B:
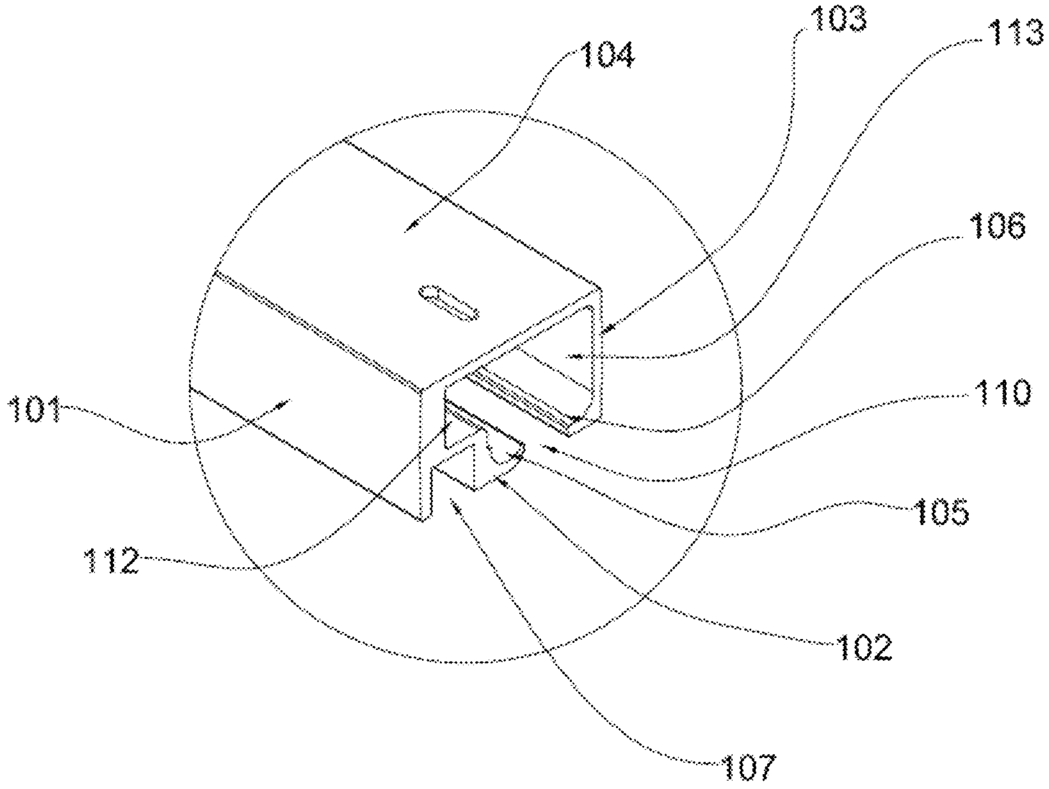
FIG. 4*b* is an enlarged view of part A in FIG. 4*a;*

As shown in FIG. 4*a* and FIG. 4*b*, the longitudinal passage 108 in the track 10 is surrounded by an upper wall 104, a lower wall 102, a front wall 101, and a rear wall 103, the longitudinal passage 108 includes a positioning component receiving groove 112 and a sliding groove 113 in which the flexible closer component and the pulley component can move, the positioning component receiving groove 112 and the sliding groove 113 extend in the longitudinal direction of the track 10 and are distributed adjacently in the lateral direction of the track 10, and the lower wall 102 has a longitudinal opening 110 and sliding surfaces 105 and 106 supporting the pulley component. A strip-shaped mounting hole 109 for mounting and fastening the positioning component is formed on the upper wall 104 of the track 10, and the use of the strip-shaped mounting hole 109 can facilitate adjustment of the position of the positioning component relative to the track 10. Connecting holes 111 are disposed on two ends of the track 10 to fasten the track 10 to the left and right wallboards or frames of the wall or shower room by using connecting members. An opening groove 107 extending in the longitudinal direction of the track 10 is formed on the lower wall 102, and the fixed door piece 70, a waterproof seal (not shown), and the like can be mounted in the opening groove 107 in a fastening manner. Certainly, in other embodiments, another movable door piece may be provided without disposing a fixed door piece.

Figure 4C:
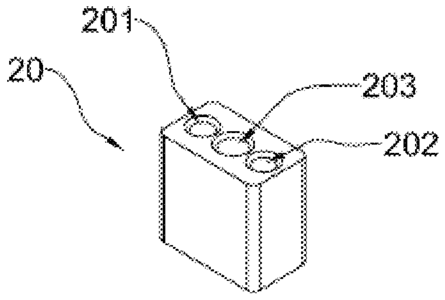
FIG. 4*c* is an enlarged view of a positioning member in FIG. 4*a;*
Figure 4D:
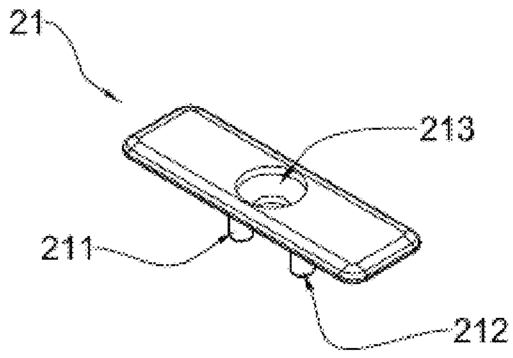
FIG. 4*d* is an enlarged view of a positioning member fastening piece in FIG. 4*a;*

Referring to FIG. 3 and FIG. 4*a*, the upper wall 104 is sandwiched between the positioning member fastening piece 21 and the positioning member 20, the positioning member fastening piece 21 is located above the upper wall 104, and the positioning member 20 is located under the upper wall 104 and the positioning member 20 is integrally located in the positioning component receiving groove 112. Referring to FIG. 4*c*, two positioning holes 201 and 202 and one mounting hole 203 are disposed on an upper end surface of the positioning member 20. Referring to FIG. 4*d*, two positioning pins 211 and 212 fitting with the positioning holes 201 and 202 and a through hole 213 fitting with the mounting hole 203 are disposed on the positioning member fastening piece 21. The positioning member 20 is mounted into a position corresponding to the strip-shaped mounting hole 109 in the positioning component receiving groove 112 from an end opening of the longitudinal passage 108 in the track 10. The positioning member fastening piece 21 is connected to the positioning member 20 and fastened to the upper wall 104 of the track 10 by fitting a positioning member connecting member (not shown), such as a screw, with the through hole 213 and the mounting hole 203. The width of the positioning member 20 in the lateral direction of the track 10 is greater than the width of the strip-shaped mounting hole 109, to restrict the positioning member 20 in the positioning component receiving groove 112.

Figure 5:
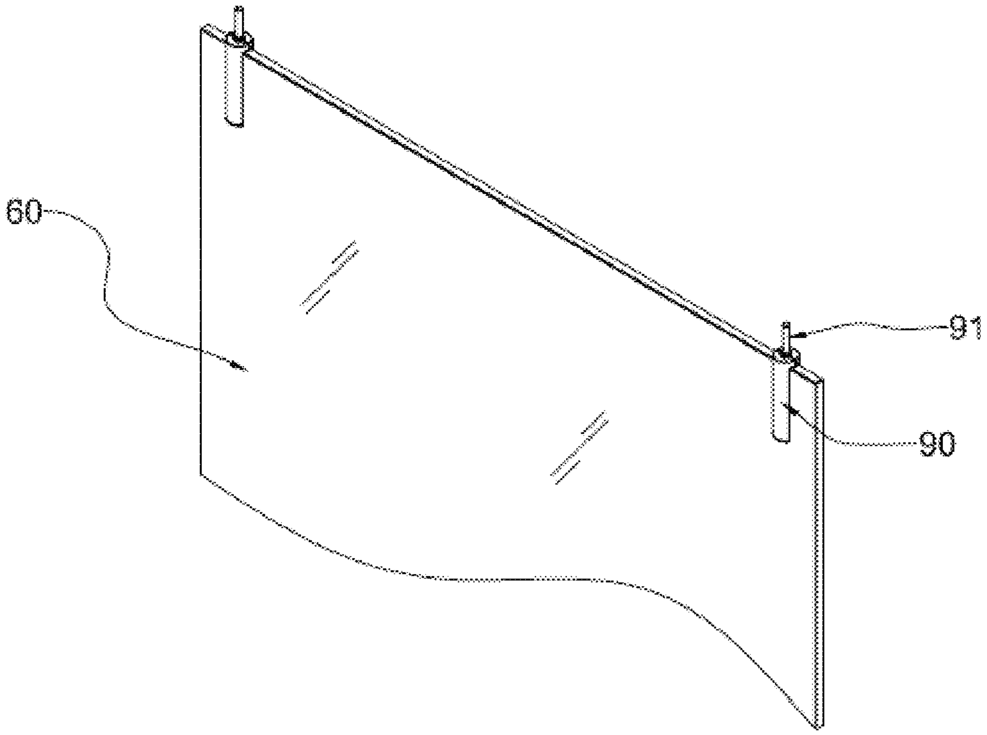
FIG. 5 is a view of an assembly structure of a movable door piece, a glass clamp component, and an adjusting screw in the shower door sliding mechanism shown in FIG. 2.
Figure 6:
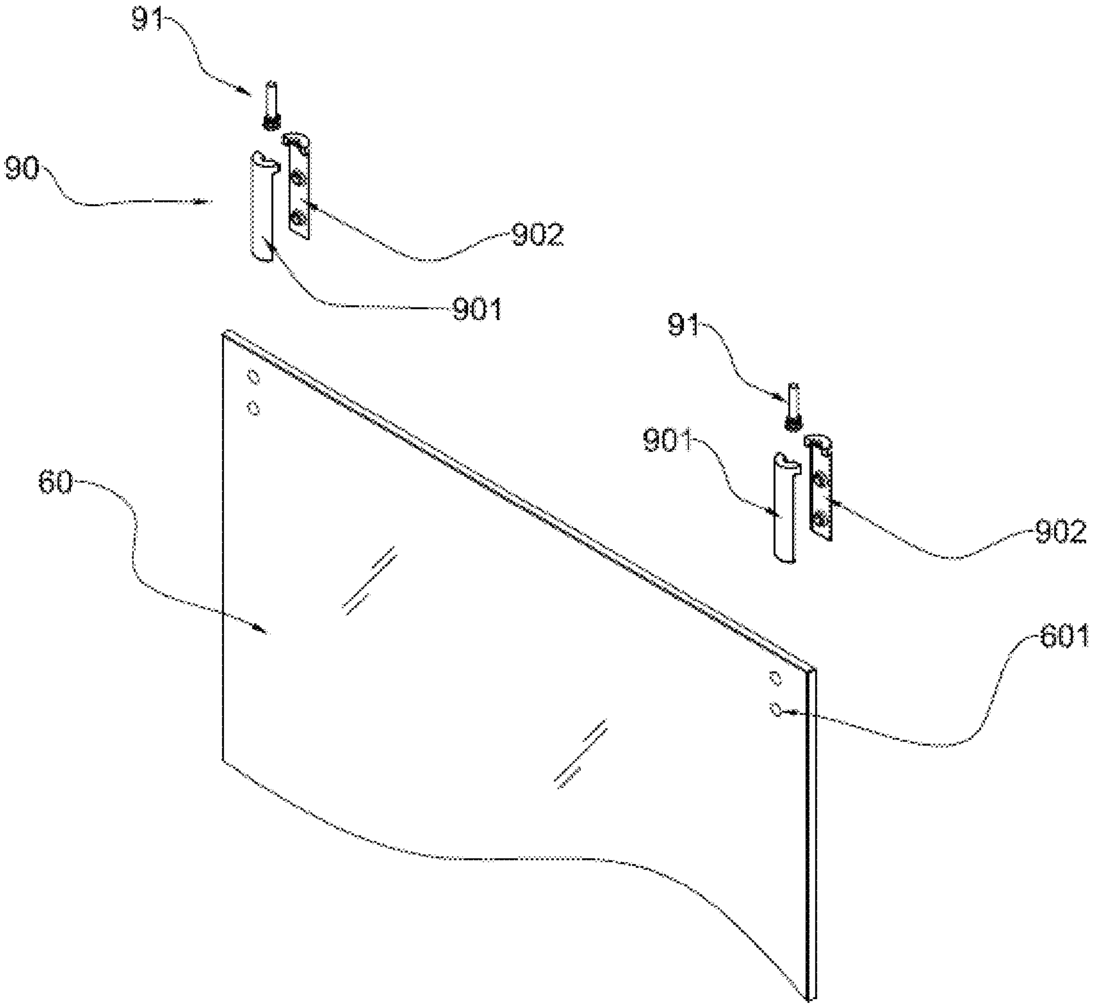
FIG. 6 is a schematic exploded view of the assembly structure shown in FIG. 5.
Figure 7A:
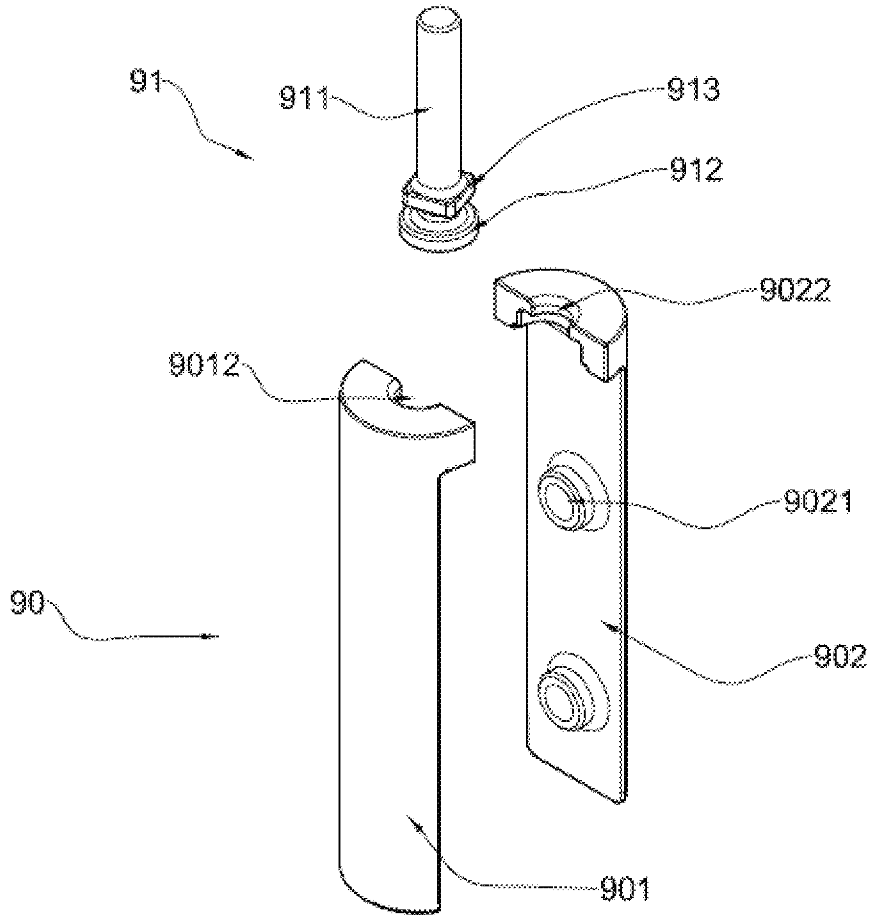
FIG. 7*a* is an enlarged view of the glass clamp component and the adjusting screw in FIG. 6.
Figure 7B:
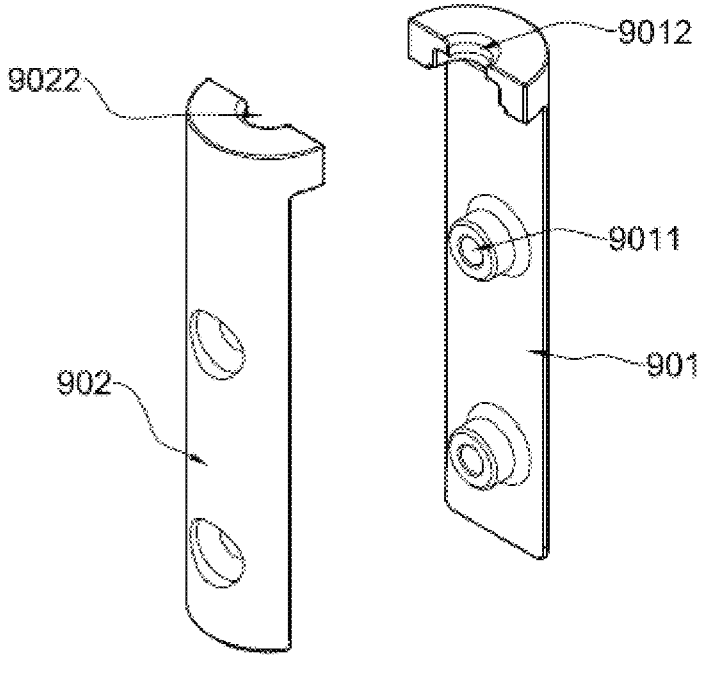
FIG. 7*b* is an enlarged view of the glass clamp component in FIG. 6 from another view.

FIG. 5 is a view of an assembly structure of the movable door piece 60, the glass clamp component 90, and the adjusting screw 91. FIG. 6 is a schematic exploded view of the assembly structure shown in FIG. 5, and also shows a state of the glass clamp component 90 from another view. A glass clamp mounting hole 601 is disposed at the top of the movable door piece 60, and the glass clamp component 90 includes a first glass clamp piece 901 and a second glass clamp piece 902. As shown in FIG. 7*a* and FIG. 7*b*, fitted threaded holes 9011 and 9021 are respectively disposed in the first glass clamp piece 901 and the second glass clamp piece 902, and the first glass clamp piece 901 and the second glass clamp piece 902 can be assembled and fastened to the movable door piece 60 by using screws. Stepped semicircular holes 9012 and 9022 are further disposed in the first glass clamp piece 901 and the second glass clamp piece 902, the adjusting screw 91 includes a threaded cylinder 911 with a square step 913 and a circular step 912 disposed at the bottom thereof, and the square step 913 and the circular step 912 fit with a circular hole formed by the stepped semicircular holes 9012 and 9022 in the first glass clamp piece 901 and the second glass clamp piece 902, so that the movable door piece 60 is suspended at a lower end of the adjusting screw 91 by using the glass clamp component 90. The threaded cylinder 911 at an upper portion of the adjusting screw 91 fits with and is connected to the threaded hole 403 in the pulley component, and the square step 913 is twisted by using an open-end wrench, to adjust the height of the movable door piece 60.

Figure 8:
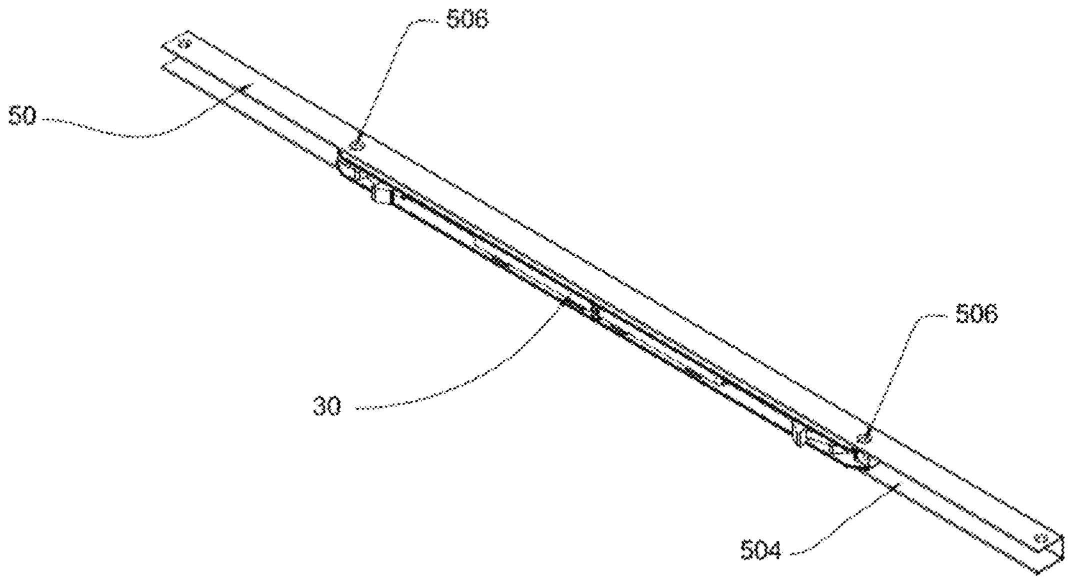
FIG. 8 is a view of an assembly structure of a flexible closer component in the shower door sliding mechanism shown in FIG. 2.
Figure 9:
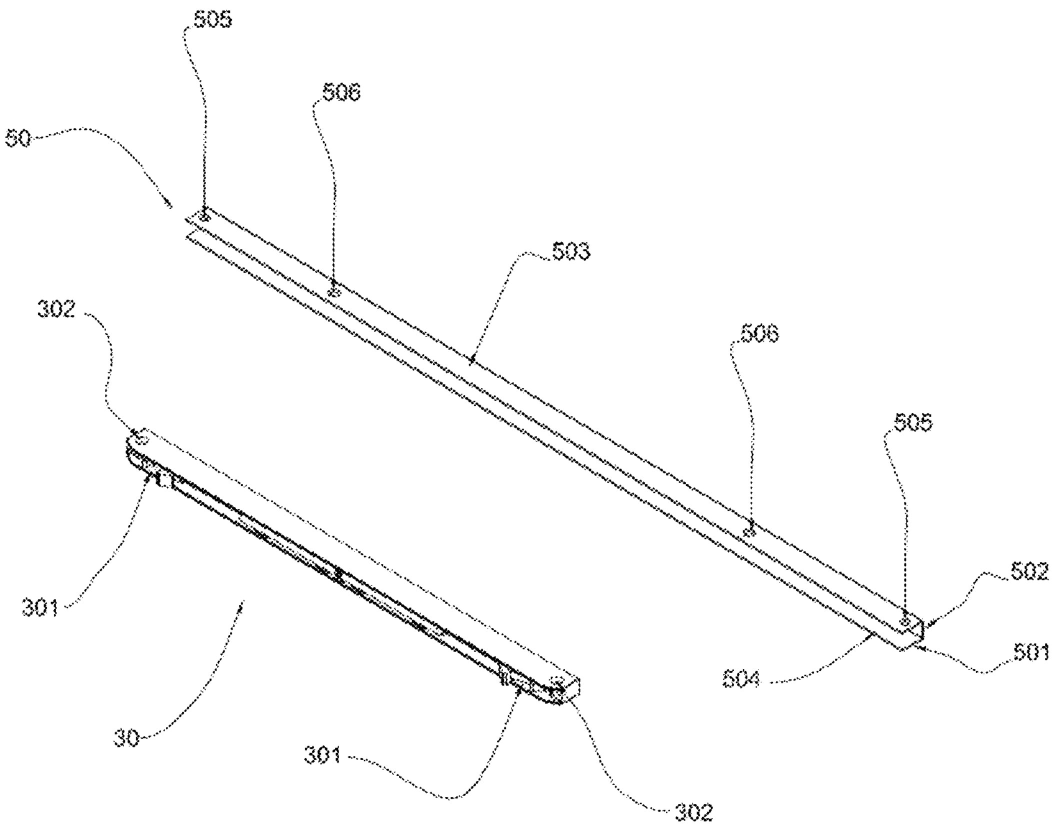
FIG. 9 is a schematic exploded view of the flexible closer component shown in FIG. 8.

As shown in FIG. 8 and FIG. 9, the flexible closer component includes the fastening bracket 50 and the flexible closer 30. The flexible closer 30 is an integrated flexible closer for both door opening and closing, where a flexible closer for door closing is located on the right side and a flexible closer for door opening is located on the left side. The fastening bracket 50 is elongated and is a U-shaped cross-sectional profile surrounded by an upper wall 503, a lower wall 501, and a rear wall 502, a closer receiving cavity 504 adapted to receive the flexible closer 30 and a front-side opening 507 opposite to the rear wall 502 are formed in the profile, first connecting holes 506 for connecting to the flexible closer 30 in a fastening manner by using connecting members and second connecting holes 505 for connecting to pulley seats 40 in a fastening manner by using connecting members are disposed in at least one of the upper wall 503, the lower wall 501, and the rear wall 502, the second connecting holes 505 are located at two ends of the fastening bracket 50, and the first connecting holes 506 are located between the second connecting holes 505 at the two ends of the fastening bracket 50. Third connecting holes 302 fitting with the first connecting holes 506 in the fastening bracket 50 are disposed in the flexible closer 30. The bayonet 301 is disposed on the surface of the flexible closer 30. The bayonet

301 can perform damped movement in the longitudinal direction relative to the main body of the flexible closer 30 under the action of an external force. The size of the bayonet 301 corresponds to the length of the positioning member 20. During movement of the flexible closer 30 relative to the positioning member 20, when the positioning member 20 is in contact with and coupled to the bayonet 301, the flexible closer 30 acts to achieve cushioning and soft positioning. Because the flexible closer belongs to the prior art, an internal structure and a specific working principle thereof are not described in detail. The flexible closer 30 is placed into the closer receiving cavity 504 from the front-side opening 507, and the flexible closer 30 is fastened to the fastening bracket 50 by fitting connecting members, such as screws, with the first connecting holes 506 and the third connecting holes 302, to form the flexible closer component.

Figure 10:
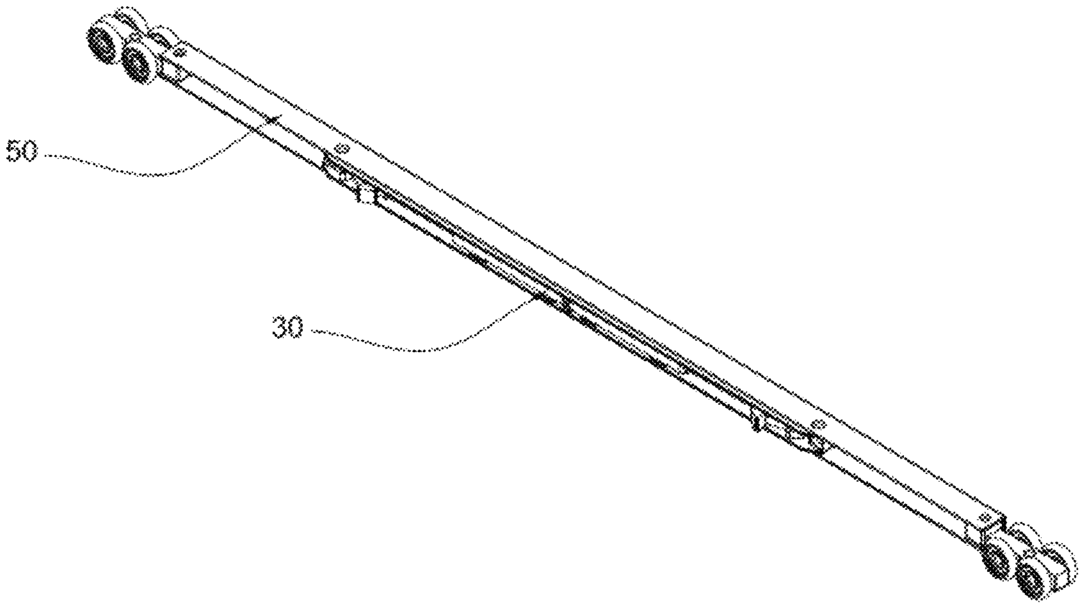
FIG. 10 is a view of an assembly structure of a pulley component and the flexible closer component in the shower door sliding mechanism shown in FIG. 2.
Figure 11:
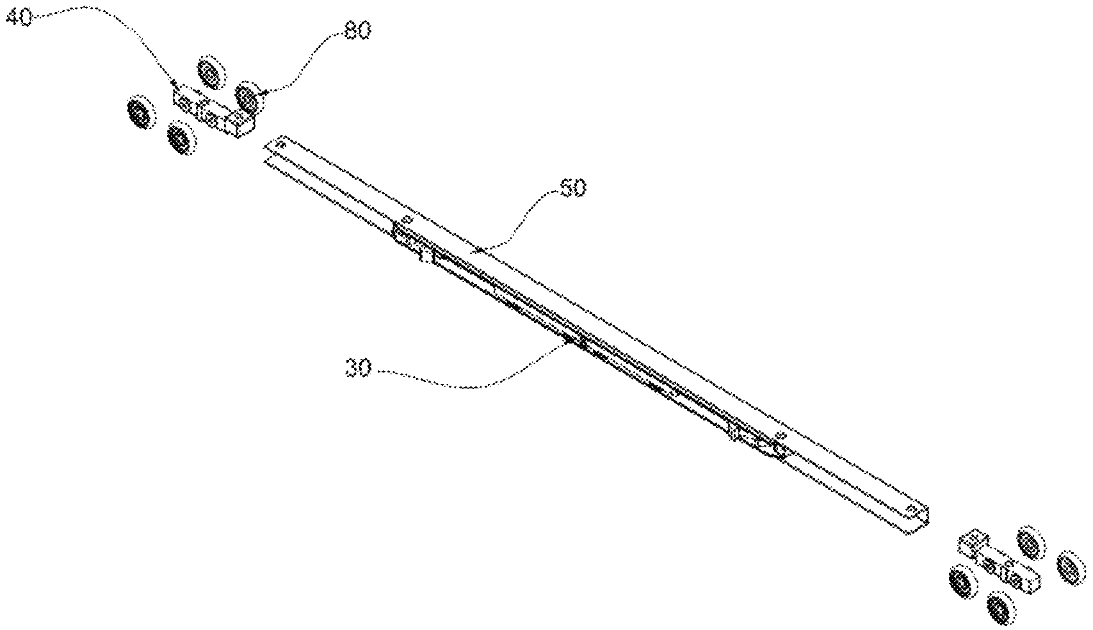
FIG. 11 is a schematic exploded view of the assembly structure shown in FIG. 10.
Figure 12:
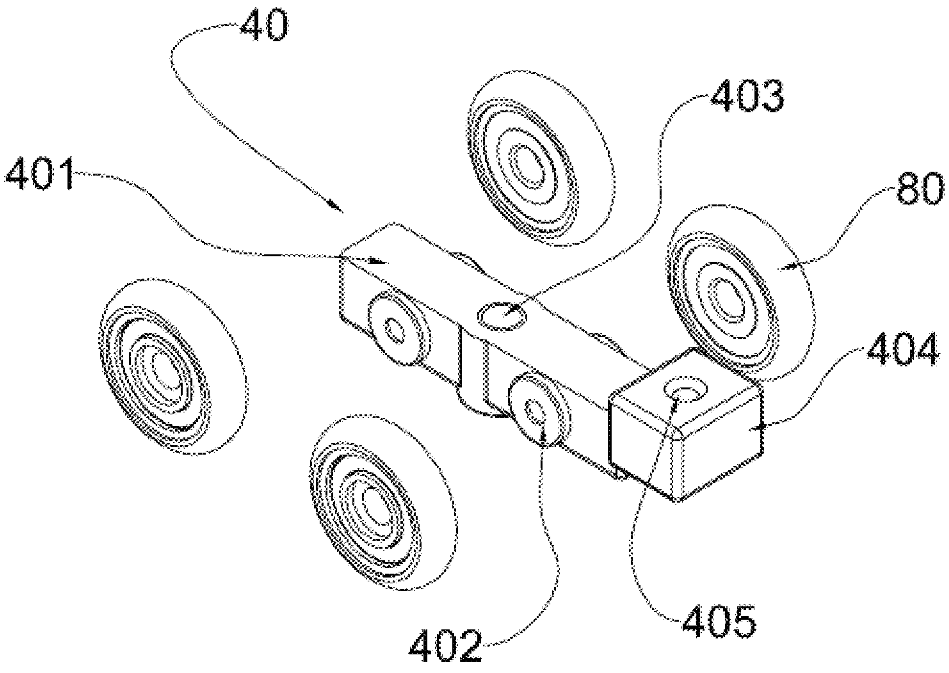
FIG. 12 is an enlarged view of the pulley component in FIG. 11.

As shown in FIG. 10 to FIG. 12, the flexible closer component is connected between the left and right pulley components. The pulley component includes the pulley seat 40 and the pulleys 80 mounted on the pulley seat 40. The pulley seat includes a strip-shaped pulley seat main body 401. One or more bosses 402 extend from one or two sides of the pulley seat main body 401. The pulley 80 is mounted on the boss 402. The threaded hole 403 penetrates through the center of the pulley seat 40 in the height direction. A connecting block 404 for connecting and fastening to the fastening bracket 50 is disposed at one end of the pulley seat 40. A connecting hole 405 is disposed in the connecting block 404. The pulley seat 40 can be fastened to an end portion of the fastening bracket 50 by fitting a connecting member, such as a screw, with the connecting hole 405 and the second connecting hole 505.

Figure 13:
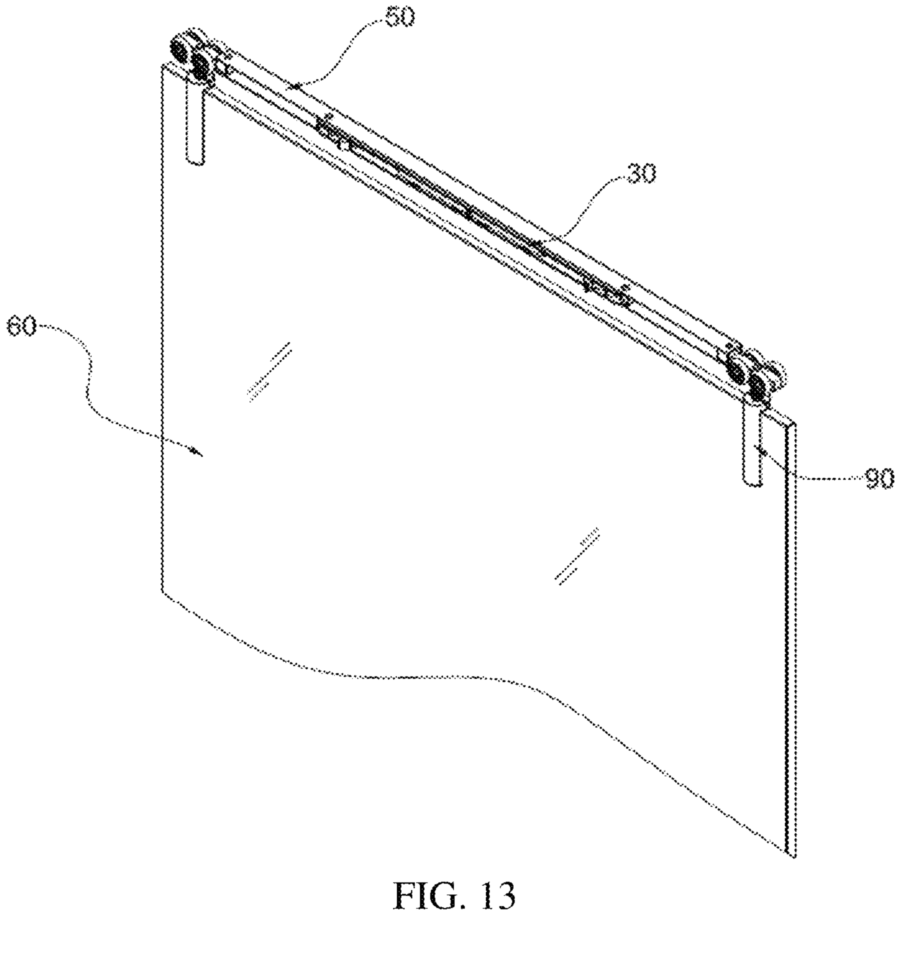
FIG. 13 is a schematic structural view in which the movable door piece is suspended directly below the pulley component and the flexible closer component by using the glass clamp component and the adjusting screw in the shower door sliding mechanism shown in FIG. 2.
Figure 14:
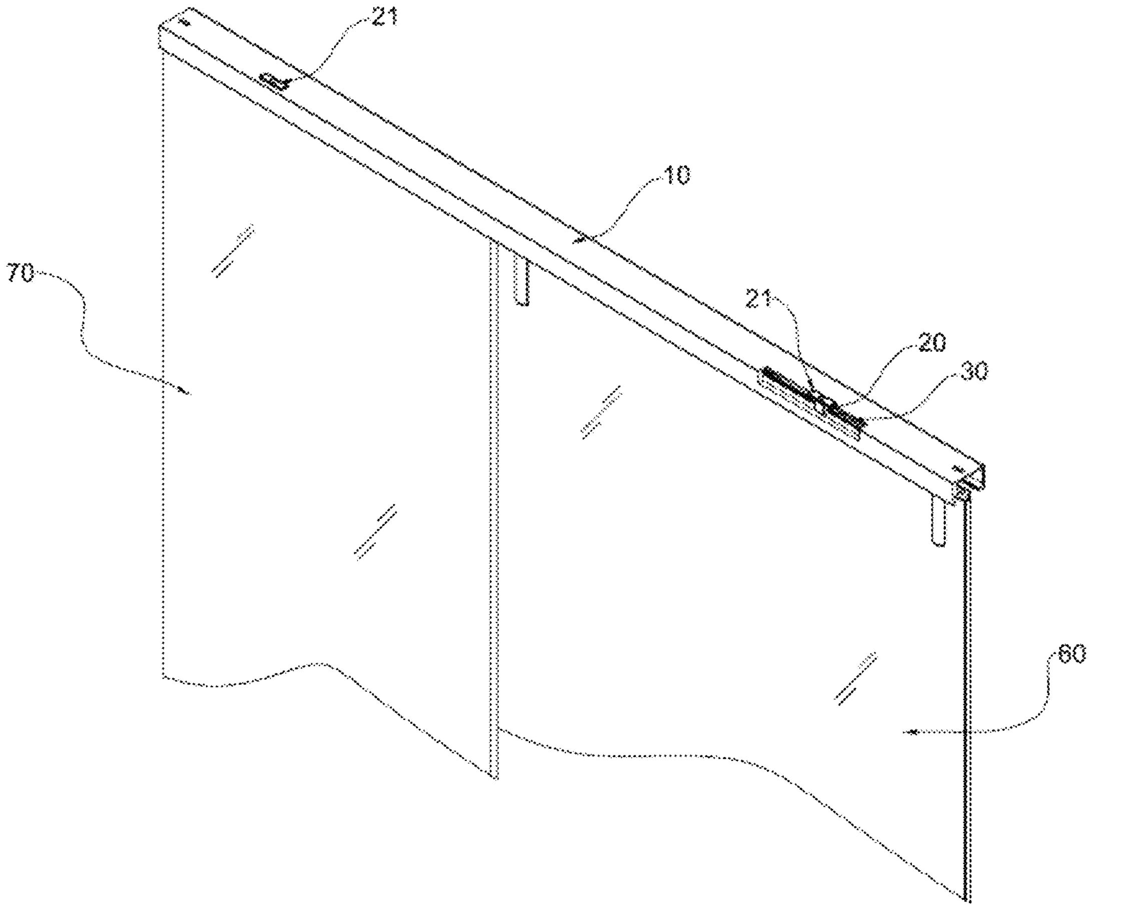
FIG. 14 is a structural working view in which the movable door piece slides along a track to be in contact with and start the flexible closer component in the shower door sliding mechanism shown in FIG. 2.

As shown in FIG. 13 and FIG. 14, the flexible closer component and the pulley component move in the sliding groove 113 in the track 10 by using the pulley 80, so that the flexible closer component and the pulley component are completely hidden in the track 10. When the movable door piece 60 moves to a certain position in the closing direction, a bayonet 301 on the door closing side of the flexible closure member 30 is in contact with and coupled to the positioning member 20 for door closing mounted on the track 10, so that the flexible closure member 30 acts to prevent the movable door piece 60 from moving at a high speed and cause the movable door piece 60 to automatically close at a certain low speed. Likewise, when an external force causes the movable door piece 60 to move to a certain position in the door opening direction, a bayonet 301 on the door opening side of the flexible closer 30 is in contact with and coupled to the positioning component 20 for door opening mounted on the track 10, so that the flexible closer 30 acts to prevent the movable door piece 60 from moving at a high speed and cause the movable door piece 60 to automatically reach the door opening position at a certain low speed. Only the flexible closer for door closing or only the flexible closer for door opening may be disposed based on an actual need. Certainly, the bi-directional soft positioning structure for door opening and closing described in this embodiment is more common. Therefore, the shower door sliding mechanism in this embodiment can be used to achieve artistic and impact-free soft positioning.

The positioning component on the track is mounted on one side of the flexible closer component. In this lateral mounting manner, inner space of the track can be fully utilized to greatly reduce the height of the track and reduce the overall weight and manufacturing costs of the track, and improve the overall aesthetics of the product.

INDUSTRIAL APPLICABILITY

The shower door sliding mechanism for soft positioning in the present invention can be manufactured and used in industry, and therefore has industrial applicability.

The invention claimed is:

1. A shower door sliding mechanism for soft positioning, comprising a track component disposed in a fastening manner, a movable door piece, a pulley component, and a flexible closer component movably disposed in the track component by using the pulley component, wherein the flexible closer component comprises a fastening bracket and a flexible closer having a bayonet, the flexible closer is fastened to the fastening bracket, and the fastening bracket is connected and fastened to the pulley component and located between two pulley components;

the track component comprises a track having a longitudinal passage therein and a positioning component that is fastened to the track and that coupled to the bayonet;

the longitudinal passage is surrounded by an upper wall, a lower wall, a front wall, and a rear wall of the track, the longitudinal passage comprises a positioning component receiving groove and a sliding groove for the flexible closer component and the pulley component can move within the sliding groove, the positioning component receiving groove and the sliding groove extend in the longitudinal direction of the track and are distributed adjacently in the lateral direction of the track, and the lower wall has a longitudinal opening and a sliding surface supporting the pulley component; and a glass clamp component is disposed at the top of the movable door piece, and the top of the glass clamp component is connected to a threaded hole in the pulley component by using an adjusting screw, so that the movable door piece is integrally suspended directly below the flexible closer component and the pulley component.

2. The shower door sliding mechanism according to claim 1, wherein a strip-shaped mounting hole for mounting and fastening the positioning component is formed on the upper wall of the track, the positioning component comprises a positioning member and a positioning member fastening piece, the upper wall is sandwiched between the positioning member fastening piece and the positioning member, the positioning member fastening piece is located above the upper wall, the positioning member is located under the upper wall and the positioning member is integrally located in the positioning component receiving groove, two positioning holes and one mounting hole are disposed on an upper end surface of the positioning member, two positioning pins fitting with the positioning holes and a through hole fitting with the mounting hole are disposed on the positioning member fastening piece, the positioning member fastening piece is connected and fastened to the positioning member by fitting a positioning member connecting member with the through hole and the mounting hole, and the width of the positioning member in the lateral direction of the track is greater than the width of the strip-shaped mounting hole.

3. The shower door sliding mechanism according to claim 1, wherein the glass clamp component comprises a first glass clamp piece and a second glass clamp piece, the first glass clamp piece and the second glass clamp piece are assembled and fastened to the movable door piece by using mutually fitted threaded holes and screws, stepped semicircular holes are further disposed in the first glass clamp piece and the second glass clamp piece, the adjusting screw comprises a threaded cylinder with a square step and a circular step disposed at the bottom thereof, and the square step and the circular step fit with a circular hole formed by the stepped semicircular holes in the first glass clamp piece and the second glass clamp piece, so that the movable door piece is suspended at a lower end of the adjusting screw by using the glass clamp component.

4. The shower door sliding mechanism according to claim 1, wherein the pulley component comprises a pulley seat and a pulley mounted on the pulley seat, the pulley seat comprises a strip-shaped pulley seat main body, one or more bosses extend from one or two sides of the pulley seat main body, the pulley is mounted on the boss, a connecting block for connecting and fastening to the fastening bracket is disposed at one end of the pulley seat, and a connecting hole is disposed in the connecting block.

5. The shower door sliding mechanism according to claim 1, wherein the fastening bracket is elongated and is a U-shaped cross-sectional profile surrounded by an upper wall, a lower wall, and a rear wall, a closer receiving cavity adapted to receive the flexible closer and a front-side opening opposite to the rear wall are formed in the profile, first connecting holes for connecting to the flexible closer in a fastening manner by using connecting members and second connecting holes for connecting to pulley seats in a fastening manner by using connecting members are disposed in at least one of the upper wall, the lower wall, and the rear wall, the second connecting holes are located at two ends of the fastening bracket, and the first connecting holes are located between the second connecting holes.

6. The shower door sliding mechanism according to claim 1, wherein third connecting holes for connecting and fastening to the fastening bracket are disposed in the flexible closer, the bayonet is disposed on the surface of the flexible closer, the size of the bayonet corresponds to the length of the positioning member, and when the positioning member is in contact with and coupled to the bayonet, the flexible closer acts to achieve soft positioning.

7. The shower door sliding mechanism according to claim 1, wherein the flexible closer comprises a flexible closer for door closing and/or a flexible closer for door opening.

8. The shower door sliding mechanism according to claim 1, wherein an opening groove extending in the longitudinal direction of the track is formed on the lower wall, and a fixed door piece and a waterproof seal are mounted in the opening groove in a fastening manner.

9. The shower door sliding mechanism according to claim 1, wherein connecting holes for fastening the track are disposed on two ends of the track.

* * * * *